United States Patent [19]

DiGiacinto

[11] 4,059,922
[45] Nov. 29, 1977

[54] SPRAYER HYDROPONIC GROWER

[76] Inventor: Joseph A. DiGiacinto, 535 Ocean Blvd., Coronado, Calif. 92118

[21] Appl. No.: 648,098

[22] Filed: Jan. 12, 1976

[51] Int. Cl.$^2$ ............................................. A01G 25/00
[52] U.S. Cl. ............................................. 47/82; 47/83
[58] Field of Search .................. 47/1.2, 38.1, 38.10, 47/17, 1.1, 82, 83, 79

[56] References Cited

U.S. PATENT DOCUMENTS

| | | | |
|---|---|---|---|
| 2,431,890 | 12/1947 | Raines | 47/1.2 X |
| 2,854,792 | 10/1958 | Juda | 47/1.2 X |
| 2,855,725 | 10/1958 | Carothers | 47/1.2 X |
| 3,323,253 | 6/1967 | Robins | 47/1.2 |
| 3,768,201 | 10/1973 | Yoo | 47/1.2 X |
| 3,841,023 | 10/1974 | Carlyon, Jr. | 47/79 |
| 3,861,519 | 1/1975 | Ware | 312/266 |

FOREIGN PATENT DOCUMENTS

| | | | |
|---|---|---|---|
| 111,786 | 10/1968 | Denmark | 47/34.13 |
| 1,560,632 | 3/1969 | France | 47/1.2 |
| 2,351,508 | 10/1973 | Germany | 47/1.2 |
| 1,216,606 | 5/1966 | Germany | 47/34.12 |
| 416,200 | 1/1967 | Switzerland | 47/1.2 |

Primary Examiner—E. H. Eickholt
Attorney, Agent, or Firm—C. Michael Zimmerman

[57] ABSTRACT

A hydroponic grower is described which includes a bottom pan for containing a liquid nutrient solution and an A-frame construction which rests therein and supports plants to be grown hydroponically. The plants are supported within pots which, in turn, pass through apertures in the side walls of the A-frame construction so that the root portion of the plants are within the interior of the enclosure defined by the A-frame construction. The root end of each of the pots is permeable to liquid nutrient solution, and a spraying arrangement is provided within the pan to spray liquid therefrom upwardly to wet the roots of plants within such pots.

5 Claims, 4 Drawing Figures

SPRAYER HYDROPONIC GROWER

BACKGROUND OF THE INVENTION

The present invention relates to hydroponics and, more particularly, to a hydroponic grower which provides improved hydroponic growth while yet requiring a minimum of space for such growth.

Because of the growing world food shortage, increased attention is being paid to the use of hydroponics as a means of raising vegetative foods. Hydroponics holds the promise of growing foods in locations where soil, terrain, and climatic conditions adversely affect or prevent vegetative growth by standard earth cultivation.

To be acceptable for use in producing large quantities of vegetative foods, it is believed that a hydroponic grower must have certain characteristics. For one, such a grower should not only be adaptable to growing different kinds of vegetative foods but also should rely only minimally on its environment for its operation. Moreover, for high productivity such a grower should reproduce to the extent possible the growing conditions under which plants have evolved. Also, such a grower should minimize the amount of floor space or area required for plant growth in order to enable optimum utilization of available space.

SUMMARY OF THE INVENTION

The present invention is a hydroponic grower which is capable of simultaneously growing different plants, is essentially self-contained and portable, and minimizes the amount of floor space or area required for plant growth. In its basic aspects, the hydroponic grower of the invention is an enclosure which has a bottom pan portion for containing a liquid nutrient solution and a wall positioned above such portion adapted to support a plurality of plants. The wall is adapted to support such plants with their foliage exterior of the enclosure and their roots interiorly thereof above the liquid in the pan portion.

As a particularly salient feature of the instant invention, it further includes as part of the combination liquid spraying means inside of the enclosure for spraying liquid nutrient solution in the enclosure pan upwardly to wet the plant roots. That is, rather than the roots of the plants being submerged in a liquid nutrient solution as is conventional, the liquid nutrient solution is delivered to the roots in a spray. Intermittent operation of such a spray will provide the roots with periodic wetting similar to the periodic wetting experienced by the roots of plants cultivated conventionally in the earth. Moreover, the spray will capture carbon dioxide and other constituents of the atmosphere and deliver the same to the plant roots. Thus, whereas roots submerged in liquid nutrient solution do not, in general, receive the aeration which roots of plants in nature receive, the instant invention provides such aeration.

Most desirably, the liquid spray means is provided by a pump which is positioned within the enclosure and connected to a spray head to deliver liquid nutrient solution thereto directly from the pan of the unit. With such an arrangement, the hydroponic grower is essentially self-contained and portable. That is, the only connection that need be made between the hydroponic grower and the external environment is one providing energy for driving the pump, e.g., electricity. In contrast, most hydroponic growers which are now available require external piping systems to which the grower must be connected for liquid circulation.

The wall of the enclosure which supports the plurality of plants is preferably provided as a pair of walls inclined relative to the bottom of the pan portion in an A-frame configuration. This construction results in the plants being distributed over the area provided by inclined surfaces, rather than over a horizontal area. The amount of horizontal floor space required for plant growth is thereby reduced. Moreover, the orientation of the plants at an incline can be used to cant the same toward a light source, e.g., the sun. Also, when a plurality of hydroponic growers of the invention having A-frame configurations for the growing walls are placed side-by-side, the facing surfaces on adjacent growers diverge from one another to thereby expose the plants of each to any light source, such as the sun, positioned therabove.

The invention includes other features and advantages which will become apparent from, or will be described in, the following more detailed description of the preferred embodiment.

BRIEF DESCRIPTION OF THE DRAWING

With reference to the accompanying two sheets of drawing.

DETAILED DESCRIPTION OF THE PREFERRED EMBODIMENT

Figure 1:
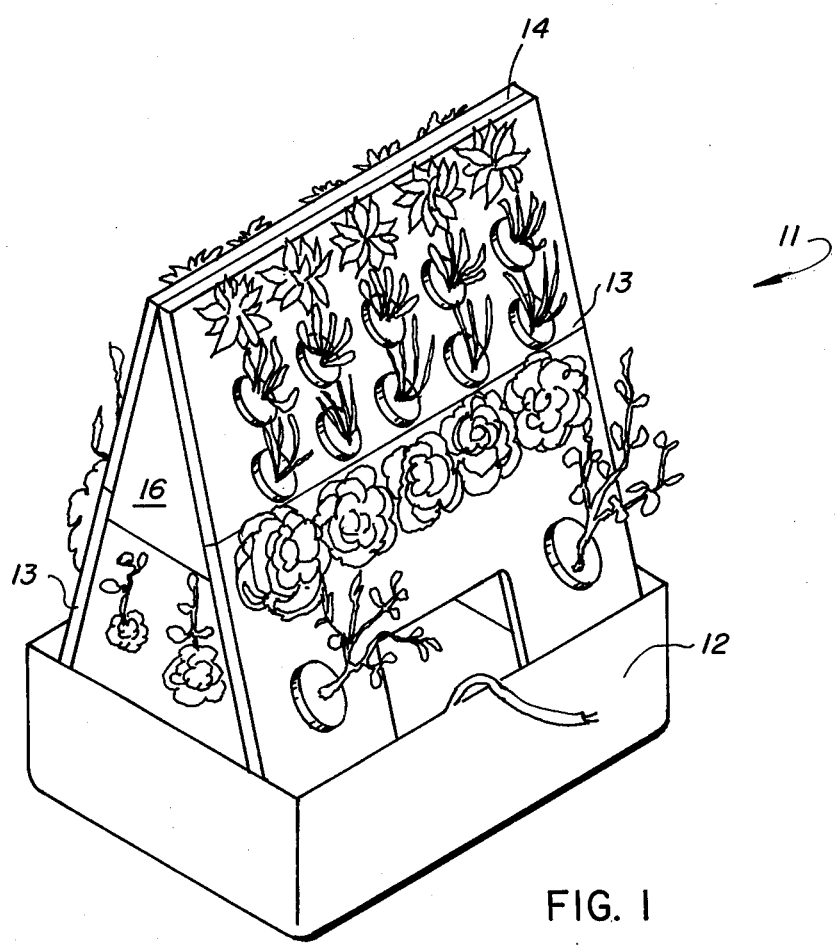
FIG. 1 is a somewhat schematic isometric view of a preferred embodiment of the portable hydroponic grower of the invention.

A preferred embodiment of the portable hydroponic grower of the invention is generally referred to in FIG. 1 by the reference numeral 11. Grower 11 includes a bottom or base pan portion 12 for containing a liquid nutrient solution, and a pair of rigid, flat (generally planar) sheets 13 which are inclined relative to the bottom of the pan portion and, hence, the bottom of the grower. Such sheets are in an A-frame configuration set within the base pan so that the pan circumscribes the lower ends of the A-frame inclined walls and the A-frame apex 14 is positioned above the bottom pan. End walls 16 are provided closing the gap between the inclined walls 13 with the result that the A-frame and bottom pan portion define a hollow enclosure.

Figure 2:
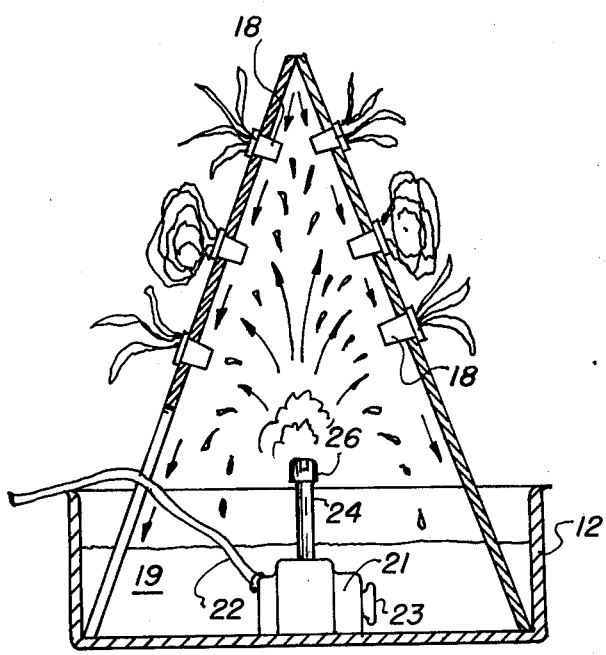
FIG. 2 is a sectional view of the grower of FIG. 1 illustrating its interior construction and the manner in which the roots of plants are communicated with liquid nutrient solution.
Figure 3:
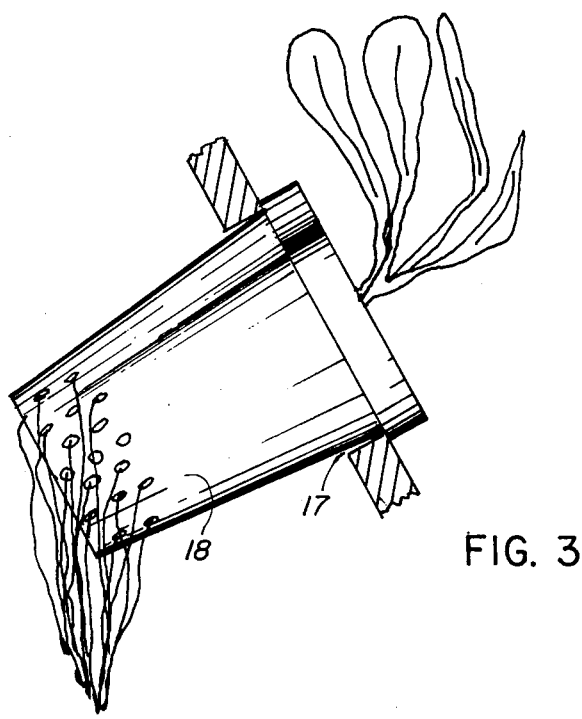
FIG. 3 is an enlarged, partial sectional view showing the manner in which a plant is supported by the grower of FIG. 1.

Each of the inclined walls 13 supports a plurality of plants distributed over its area with the foliage of such plants exteriorly of the enclosure provided by the grower, and the roots thereof interiorly of such enclosure. Reference is made to FIGS. 2 and 3 for a more detailed showing of the construction providing the plant support. As illustrated in such figures, each of the walls 13 has an array of apertures 17 extending generally normally therethrough and communicating with the interior of the enclosure. The roots of the plants are supported within a pot 18 by a porous medium (not shown), such as peat or the like, and each pot 18 extends, in turn, through an associated one of the apertures 17 in the wall 13. Each pot 18 engages the peripheral edge of its associated aperture so that it is held in position on the wall with the plant foliage exteriorly of the enclosure and the plant root interiorly thereof.

As best seen by the showing in FIG. 3, each of the pots 18 is tapered inwardly toward its lower or root end, i.e., that end thereof within the interior of the enclosure and containing the roots of the plant, so that its shape adapts the same to be easily removed from its associated aperture merely by the application of slight outward axial force. Thus, each of the plants within the grower can be easily separated therefrom for harvesting, individual attention, etc.

As a particularly salient feature of the instant invention, it further includes liquid spray means positioned within the enclosure for spraying liquid nutrient solution in the bottom pan toward the plant roots to wet the same. More particularly, as shown in FIG. 2, submerged within the liquid solution 19 is a submergible pump 21 which is connectible via a cord 22 or the like to a source of electrical energy exterior to the grower. As illustrated, the pump 21 includes a liquid intake 23 in the solution 19, and an outlet pipe 24 extending to a position above the liquid in the pan 12. Outlet pipe 24 terminates at its upper end in a spray head 26.

Spray head 26 is selected to spray solution delivered thereto under pressure by the pump 21 upwardly against the lower end of the pots 18 projecting into the enclosure through the walls 13. Such pot lower ends are permeable to the liquid nutrient solution. That is, as is best shown in FIG. 3, the lower end of each of the pots is provided with a plurality of apertures 27 through which solution can flow into the interior for absorption by the plant roots. In practice, it has been found that as a plant develops within the pot 18, the roots thereof will extend through the apertures 27 into the enclosure. Because the interior of the enclosure is substantially a closed space, it will remain at a high humidity level even when the spray means is not operating. Thus, the roots extending through the apertures will continue to be directly exposed to moisture along with atmospheric gases within such enclosure.

For best results, spray head 26 is adapted to spray droplets of liquid upwardly to wet the plant roots, rather than merely provide a mist. This permits a relatively large amount of liquid to be delivered to the plants in a minimum of time and, consequently, reduces the amount of time in which the sprayer must be operated. While the amount of liquid delivered to the plants will depend, of course, on the types of plants, atmospheric conditions, etc., it has been found that generally two or three 15 minute spraying intervals during a 24 hour period is sufficient to sustain the growth of typical garden cash crops. It should be noted that because the lower ends of the inclined walls 13 sit within the pan 12, any liquid which is not absorbed by the plants will flow downward to the pan for recirculation. Periodically as required, e.g., once a week, the supply and concentration of liquid nutrient solution should be replenished.

Figure 4:
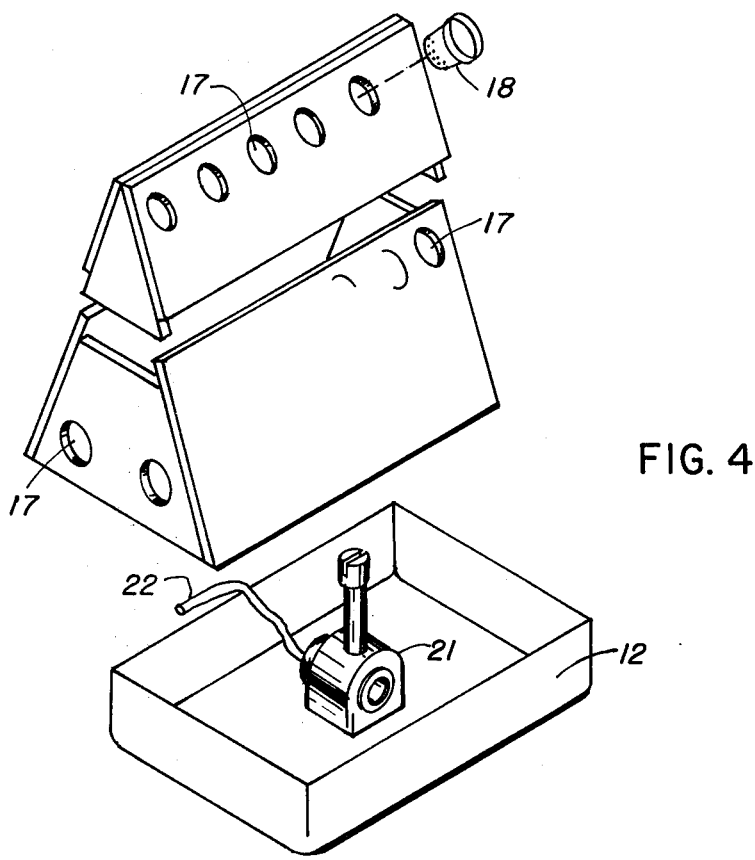
FIG. 4 is an isometric view of the hydroponic grower exploded into its principal sections from which it is assembled.

Most desirably, the hydroponic grower is sectioned into several parts to facilitate its shipping and storage in a disassembled state. FIG. 4 is a view of the grower with the various sections which are separable shown exploded from one another. That is, as is illustrated, the bottom pan portion 12 is provided as a separate section within which the A-frame construction rests. Although not shown exploded, the pump and its attached spray head merely rest in the pan and therefore can be easily removed therefrom.

The A-frame configuration itself is separable into two parts, a base portion 28 and an apex or top portion 29. As shown, the inclined side walls 13' of the base section 28 extend upwardly beyond the end wall sections 16' thereof and the end walls 16" of the apex section 29 extend downward beyond the inclined side wall 13" thereof. This provides an interlocking mating structure for positioning and holding the apex section on the base section 28. The pots 18 are removable from the inclined surfaces in the manner discussed previously.

From the above, it will be readily recognized that although the grower is provided in several sections, it is easily assembled or disassembled as desired. That is, to assemble the grower one need only stack the sections in order on one another, whereas to disassemble the grower, the sections are simply unstacked.

While the invention has been described in connection with a preferred embodiment, it will be recognized by those skilled in the art that various changes and modifications can be made without departing from its spirit. It is therefore intended that the coverage afforded applicant be limited only by the scope of the invention as set forth in the claims and their equivalent language.

I claim:

1. An essentially self-contained and portable hydroponic grower comprising an enclosure having a base pan for containing a liquid nutrient solution; a pair of walls projecting upward from said base pan to support a plurality of plants thereabove, said walls being inclined relative to the bottom of said pan in an A-frame configuration with the apex thereof above said base pan and having their lower ends circumscribed by said pan, each of said walls being generally planar and including a plurality of apertures extending generally normally therethrough communicating with the interior of said enclosure; a plurality of plant pots, each of which is adapted to contain a porous plant support medium and extend through an associated one of said apertures with its side wall in engagement with the peripheral edge of said aperture for said pot to be held in position thereby, the root end of each of said pots being permeable both to the flow of liquid nutrient solution to the interior thereof and to the passage of the roots of plants supported thereby outward; a liquid spray head positioned within said enclosure between said inclined walls to spray a liquid toward roots of plants projecting from the root ends of pots extending through said apertures; a liquid pump positioned within said base pan and connected to said spray head to deliver thereto under pressure a liquid nutrient solution contained in said pan; and end walls at opposite ends of said enclosure extending between said inclined walls and from the apex of said A-frame configuration to said base pan to define with said inclined walls a hollow enclosure containing said spray head and adapted to contain said root ends of said pots, said end walls being substantially moisture impermeable for maintaining a humid atmosphere within said enclosure.

2. A hydroponic grower according to claim 1 wherein there is a single one of said liquid spray heads positioned within said enclosure to spray liquid toward said plant roots.

3. The hydroponic grower of claim 1 wherein each of said pots has a shape adapted to facilitate removal thereof from its associated aperture and, hence, the separation of a plant therein from said grower.

4. A hydroponic grower according to claim 3 wherein each of said pots is tapered inwardly toward its lower end to provide a shape facilitating removal thereof from its associated aperture.

5. The hydroponic grower of claim 1 wherein said pair of inclined walls is separable from said base, pan, and said A-frame configuration is separable into a plurality of parts to enable said grower to be disassembled to facilitate moving and storage thereof.

* * * * *